(12) United States Patent
Schreiber

(10) Patent No.: US 7,578,542 B2
(45) Date of Patent: Aug. 25, 2009

(54) MOTOR VEHICLE

(75) Inventor: Reinhold Schreiber, Tiefenbronn (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 0 days.

(21) Appl. No.: 11/879,956

(22) Filed: Jul. 19, 2007

(65) Prior Publication Data

US 2008/0018134 A1 Jan. 24, 2008

(30) Foreign Application Priority Data

Jul. 19, 2006 (DE) .................. 10 2006 033 375

(51) Int. Cl.
*B60J 9/04* (2006.01)
(52) U.S. Cl. .................................. 296/180.5
(58) Field of Classification Search ... 296/180.1–180.5; 362/496
See application file for complete search history.

(56) References Cited

U.S. PATENT DOCUMENTS

| | | | | |
|---|---|---|---|---|
| 4,334,211 | A | * | 6/1982 | McConnell et al. .......... 340/474 |
| D290,453 | S | * | 6/1987 | Konen et al. ............... D12/181 |
| 4,787,655 | A | * | 11/1988 | Gross et al. ............... 285/127.1 |
| 4,819,132 | A | * | 4/1989 | Hwan et al. ................. 362/541 |
| 4,838,603 | A | | 6/1989 | Masoero et al. |
| D304,819 | S | * | 11/1989 | Chapman et al. ........... D12/181 |
| 5,054,844 | A | | 10/1991 | Miwa |
| 5,120,105 | A | * | 6/1992 | Brin et al. ................. 296/180.5 |
| 5,165,751 | A | * | 11/1992 | Matsumoto et al. ....... 296/180.5 |
| 5,709,453 | A | * | 1/1998 | Krent et al. ................. 362/496 |
| 5,923,245 | A | | 7/1999 | Klatt et al. |
| 6,663,272 | B1 | | 12/2003 | Liu |
| 2002/0167196 | A1 | * | 11/2002 | Huang ...................... 296/180.5 |
| 2003/0071485 | A1 | * | 4/2003 | Kazama ................... 296/180.1 |
| 2004/0184283 | A1 | | 9/2004 | A-Gi |
| 2005/0077753 | A1 | * | 4/2005 | Burg ....................... 296/180.5 |
| 2006/0108830 | A1 | * | 5/2006 | Ordonio et al. ........... 296/180.1 |
| 2006/0186698 | A1 | * | 8/2006 | Roth ....................... 296/180.1 |
| 2007/0236044 | A1 | * | 10/2007 | Froeschle et al. ......... 296/180.5 |
| 2007/0236045 | A1 | * | 10/2007 | Froeschle et al. ......... 296/180.5 |
| 2007/0236046 | A1 | * | 10/2007 | Froeschle et al. ......... 296/180.5 |

FOREIGN PATENT DOCUMENTS

| | | |
|---|---|---|
| DE | 1 009 501 | 5/1957 |
| DE | 19652692 C1 | 6/1998 |
| DE | 101 36 823 A1 | 2/2003 |
| DE | 10 2005 055 702 A1 | 5/2007 |
| EP | 0 204 005 B1 | 12/1986 |
| WO | 2007124912 A1 | 11/2007 |

OTHER PUBLICATIONS

European Search Report dated Dec. 3, 2008.

* cited by examiner

*Primary Examiner*—Hilary Gutman

(57) ABSTRACT

A motor vehicle has at least one illuminating device in a rear region and at least one wind-deflecting device likewise arranged in the rear region. The wind-deflecting device can be activated. According to the invention, the at least one wind-deflecting device is part of the rear illuminating device.

5 Claims, 2 Drawing Sheets

MOTOR VEHICLE

CROSS-REFERENCE TO RELATED APPLICATION

This application claims the priority, under 35 U.S.C. § 119, of German application DE 10 2006 033 375.6, filed Jul. 19, 2006; the prior application is herewith incorporated by reference in its entirety.

BACKGROUND OF THE INVENTION

Field of the Invention

The invention lies in the automotive technology field. More specifically, the present invention relates to a motor vehicle with at least one illuminating device disposed in the rear region, and at least one wind-deflecting device which is likewise disposed in the rear region and can be activated.

A motor vehicle of this type is known, for example, from German published patent application DE 101 36 823 A1. The wind-deflecting device comprises two spoiler elements which are spaced apart from each other and are arranged at both lateral ends of the vehicle. The spoilers can be moved from a rest position into a maximum position and back via a control device because a respective control device is provided for both spoiler elements. The control device is connected to a closed-loop control device and adjusts the spoiler elements either separately from each other or together as a function of specified and/or determined and/or measured parameters. As a result, an actively usable wind-deflecting device is to be provided even in the case of motor vehicles with a notchback.

Further wind-deflecting devices in the rear region of a motor vehicle are known, for example, from European patent EP 0 204 005 B1, from German published, prosecuted patent application DE 1 009 509, and from U.S. Pat. No. 4,838,603.

A common feature of all of the wind-deflecting devices known from the prior art is that they are either designed rigidly, i.e. cannot be activated or adjusted, or else, in the event that they are designed such that they can be activated, form an independent assembly on the motor vehicle that also, in particular, requires an independent, i.e., separate, electricity supply.

SUMMARY OF THE INVENTION

It is accordingly an object of the invention to provide a motor vehicle, which overcomes the above-mentioned disadvantages of the heretofore-known devices and methods of this general type and which provides an improved or at least a different embodiment that is distinguished, in particular, by a reduced structural outlay.

With the foregoing and other objects in view there is provided, in accordance with the invention, a motor vehicle with a rear light assembly, i.e., an illuminating device. The motor vehicle comprises at least one illuminating device disposed in a rear region of the motor vehicle; at least one wind-deflecting device disposed in the rear region of the motor vehicle and controllable for selective activation; and the at least one wind-deflecting device being commonly mounted in a common assembly with the at least one illuminating device.

In accordance with the invention, the wind-deflecting element is mounted in or on the illuminating device and capable of at least one of the following:

translatory adjustment;
rotation about an axis extending substantially transversely to the motor vehicle; or
pivoting about a virtual pivot axis disposed at a distance from the illuminating device.

In other words, the present invention is based on the general concept, in the case of a motor vehicle with at least one illuminating device arranged on the rear side, for example a taillight, and at least one wind-deflecting device which is likewise arranged on the rear side and can be activated, of forming the wind-deflecting devices as part of the rear illuminating device and, as a result, of designing the wind-deflecting device and the rear illuminating device as an associated subassembly. This affords the great advantage that, both for the wind-deflecting device and for the rear illuminating device, an electricity supply which is present in any case for the illuminating device or a connection, which is present in any case, to a CAN (Controller Area Network) bus system, can also be used for the connection of the wind-deflecting device and, as a result, a separate wiring arrangement for the wind-deflecting device, together with the associated outlay on laying it and the associated material costs, can be avoided. In particular, an electric plug-in connection on the illuminating device can also be designed in such a manner that it ensures both the electric supply of the wind-deflecting device and of the illuminating device, as a result of which the outlay on installation can be significantly reduced, since a separate connection of the wind-deflecting device to the electric system of the motor vehicle can be omitted. In the case of a bus system which is frequently present in modern vehicles, it may also be used for controlling the wind-deflecting device, as a result of which the degree of utilization of said bus system is improved.

Expediently, a control device is provided which activates and/or controls the wind-deflecting device as a function of parameters relating to vehicle dynamics. In this case, the control device may be designed, for example, in such a manner that it extends the wind-deflecting device only from a specified minimum speed of the motor vehicle, since, also, only from such a minimum speed can the wind-deflecting device carry out its function, for example of producing a negative lift force which improves the road grip. Of course, the parameters relating to vehicle dynamics may also comprise an acceleration and/or a deceleration and/or a wind speed.

In a further advantageous embodiment of the solution according to the invention, the control device controls and/or activates the wind-deflecting device as a function of an illumination function. A brake light which illuminates when a brake pedal is actuated may be cited as an example in this respect. Particularly during a deceleration operation of this type, adequate wheel grip of the motor vehicle in order to transfer braking forces to the roads is of great significance, and it is therefore conceivable that, when actuating the brake pedal, not only is the brake light of the illuminating device illuminated but at the same time the wind-deflecting device is activated and, as a result, produces a negative lift force which improves the wheel grip of the motor vehicle. Of course, it is also conceivable for the wind-deflecting device to not be activated during a braking operation from a low speed while, during a braking operation from a high speed, a rapid adjustment of the wind-deflecting device into its operative position takes place after the brake pedal is actuated.

In an advantageous development of the invention, the wind-deflecting device is integrated in a housing of the illuminating device. A uniform subassembly which is simple to handle and comprises the wind-deflecting device and the illuminating device can therefore be provided and, in particular, reduces an outlay on installation during the production of the motor vehicle, since the wind-deflecting device is now combined together with the illuminating device in a uniform subassembly and can therefore be installed together and not, as hitherto, separately.

Expediently, the wind-deflecting device can be adjusted between at least one operative position, in which a wind-deflecting element is extended or swung out, and an inoperative position, in which the wind-deflecting element is retracted or swung into the illuminating device. Different operative positions may be defined here which each extend the wind-deflecting element to a different extent and, as a result, produce different wind-deflecting properties depending on the degree to which the wind-deflecting element is swung out or extended. In its inoperative position, the wind-deflecting element is preferably retracted or swung into the illuminating device or into a housing of the illuminating device to an extent such that it does not protrude beyond an outside contour of the motor vehicle and, at best, is not perceived from the outside at all as a wind-deflecting device. For this purpose, the wind-deflecting element according to the invention may bear, at its front end in the extension direction, a decorative strip, for example, which, when the wind-deflecting element is completely retracted, is aligned with a decorative strip surrounding the illuminating device, for example, and therefore when a wind-deflecting device is in its inoperative position, the outer optical impression of the motor vehicle is maintained in its original form.

It will be understood that that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
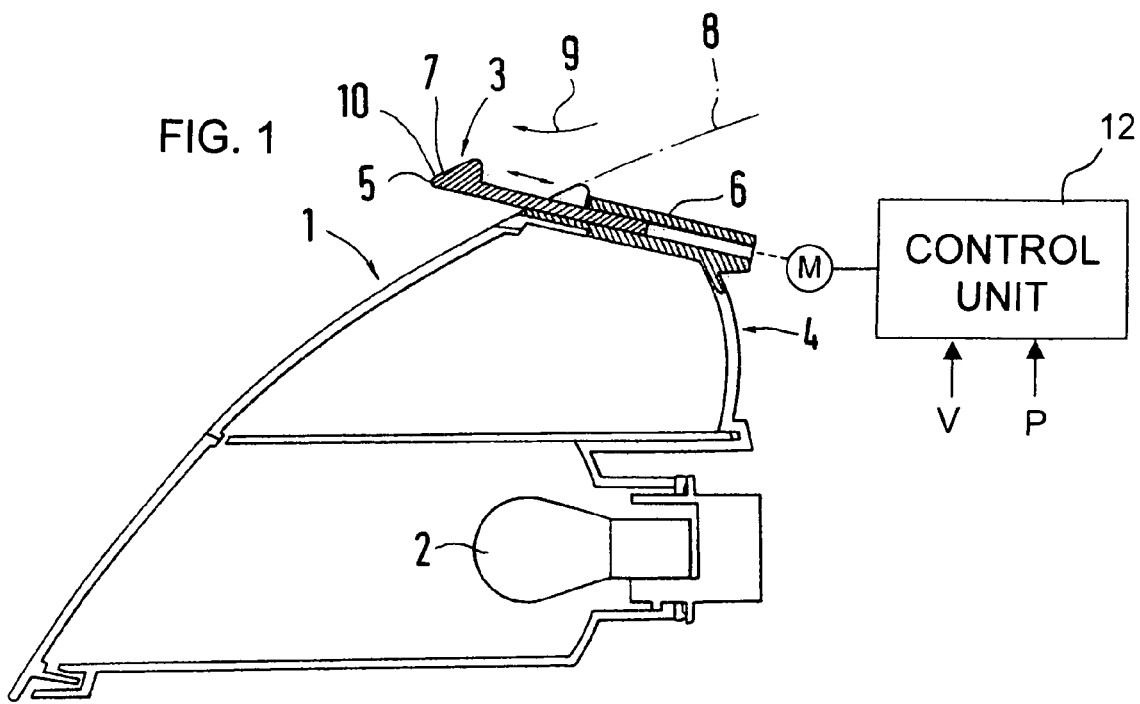
FIG. 1 shows a sectional illustration through an illuminating device according to the invention, with a wind-deflecting device which can be adjusted in a translatory manner.

Referring now to the figures of the drawing in detail and first, particularly, to FIG. 1 thereof, an illuminating device 1 has at least one illuminating means 2, for example an incandescent bulb or an LED or LED array, and a wind-deflecting device 3 arranged above or in an upper edge region of the illuminating device 1. The illuminating device 1 is thereby disposed in a rear region of a motor vehicle and may, for example, form a taillight assembly. According to the invention, the at least one wind-deflecting device 3 forms part of the rear illuminating device 1 and/or is integrated in a housing 4 of the illuminating device 1. The illuminating device 1 and the wind-deflecting device 3 therefore form an associated subassembly which, during installation, can be fitted to the motor vehicle in a single working step. This affords the great advantage that, for the wind-deflecting device 3 according to the invention, use may also be made of a connection, which is not illustrated but is present in any case for the illuminating device 1, to an electric system of the motor vehicle. Accordingly, a separate electric supply line for the wind-deflecting device 3 can be omitted. At the same time, it is also conceivable that both the wind-deflecting device 3 and the illuminating device 1 can be connected to a bus system of the motor vehicle via a common plug-in connection, thus likewise reducing the outlay on installation.

In general, the wind-deflecting device 3 or a wind-deflecting element 5 of the same can be adjusted between at least one operative position, in which it is extended (cf. FIGS. 1 to 3) or swung out (cf. FIG. 4), and an inoperative position, in which it is retracted or swung into the illuminating device 1. According to FIG. 1, the wind-deflecting element 5 of the wind-deflecting device 3 is adjusted in a translatory manner between its operative and its inoperative position and is guided in a guide, which is preferably likewise part of the housing 4 of the illuminating device 1. The wind-deflecting element 5 may be extended to different extents depending on the desired wind-deflecting property of the wind-deflecting device 3, and therefore a plurality of operative positions can be adopted. At its front end in the extension direction, the wind-deflecting element 5 can preferably have a spoiler element 7 which additionally supports a desired wind-deflecting property. In this case, the spoiler element 7 may differ in design (cf. FIGS. 1 to 3). In its retracted or swung-in state, i.e. in its inoperative position, the wind-deflecting element 5 is preferably entirely retracted into the guide 6 or into the illuminating device 1 and lies within an outer contour line 8 of the motor vehicle.

Furthermore, a design element 10 may optionally be arranged on the spoiler element 7, said design element, for example when the wind-deflecting device 3 is retracted, forming part of a decorative-strip-like border around the illuminating device 1 such that the wind-deflecting device 3, in its inoperative state, does not impair an exterior appearance of the motor vehicle.

When the wind-deflecting element 5 is extended, a relative wind 9 produces a negative lift force on the wind-deflecting element 5, thus improving the negative lift of the motor vehicle and, as a result, the wheel grip thereof. The negative lift force produced by the relative wind 9 is affected differently depending on the orientation (cf. FIGS. 1 and 2).

Figure 3:
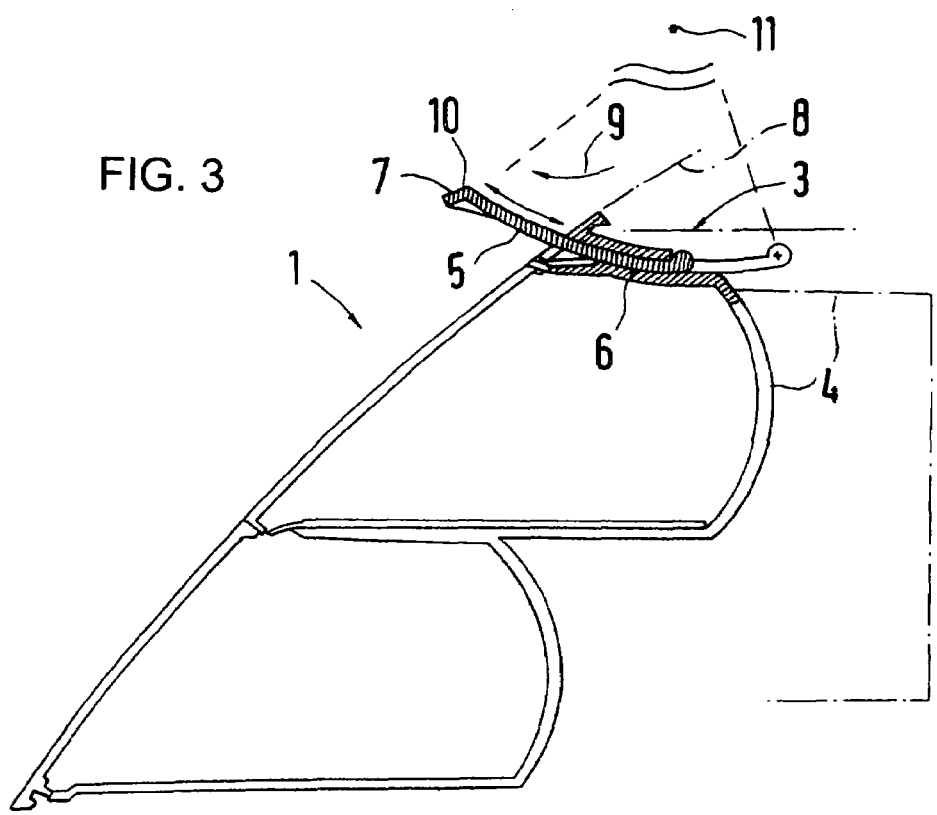
FIG. 3 shows a similar sectional view, but with a wind-deflecting device which can be adjusted in a translatory manner on a circular path.
Figure 4:
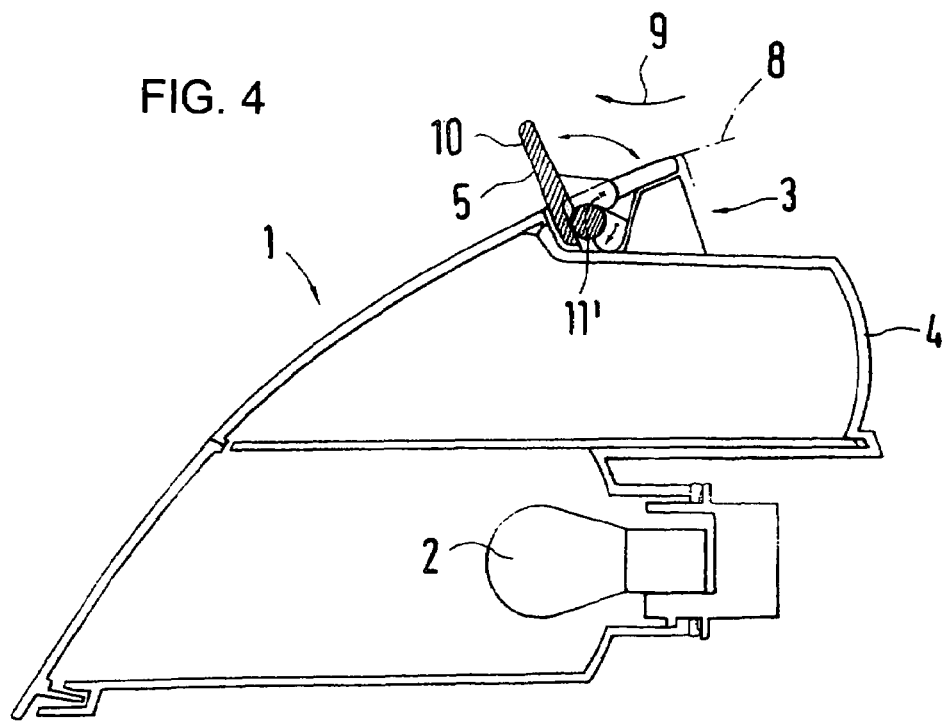
FIG. 4 is a similar view of an illuminating device with a wind-deflecting device which can be swung out.

In general, the wind-deflecting device 3 or the associated wind-deflecting element 5 can either be adjustable in a translatory manner (cf. FIGS. 1 and 2) or can be mounted pivotably about a virtual pivot axis 11 arranged at a distance from the illuminating device 1 (cf. FIG. 3) or can be mounted rotatably about an axis 11' running essentially in the transverse direction of the vehicle (cf. FIG. 4).

An extension or swinging-out movement is preferably controlled by a control unit 12, which is configured such that it activates and/or controls the wind-deflecting device 3 and its movement as a function of parameters relating to vehicle dynamics, for example a measured wind speed or a measured traveling speed. The control unit 12 is only diagrammatically illustrated with a controlled motor M for shifting the deflection element 5 and with a schematic voltage input V and a schematic signal input P through which the control unit 12 receives the necessary information concerning the dynamic parameters of the motor vehicle. Furthermore, it is conceivable for the control unit 12 to activate and/or control the wind-deflecting device 3 as a function of an illuminating function of the illuminating device 1. In this case, it is conceivable in particular that, during a braking operation from a high speed, initiated by pressure on a brake pedal, the wind-deflecting device 3 is adjusted into its operative position and, as a result, causes an increased push-down, or negative lift of the motor vehicle, thus enabling the braking forces to be transmitted better to the road.

Figure 2:
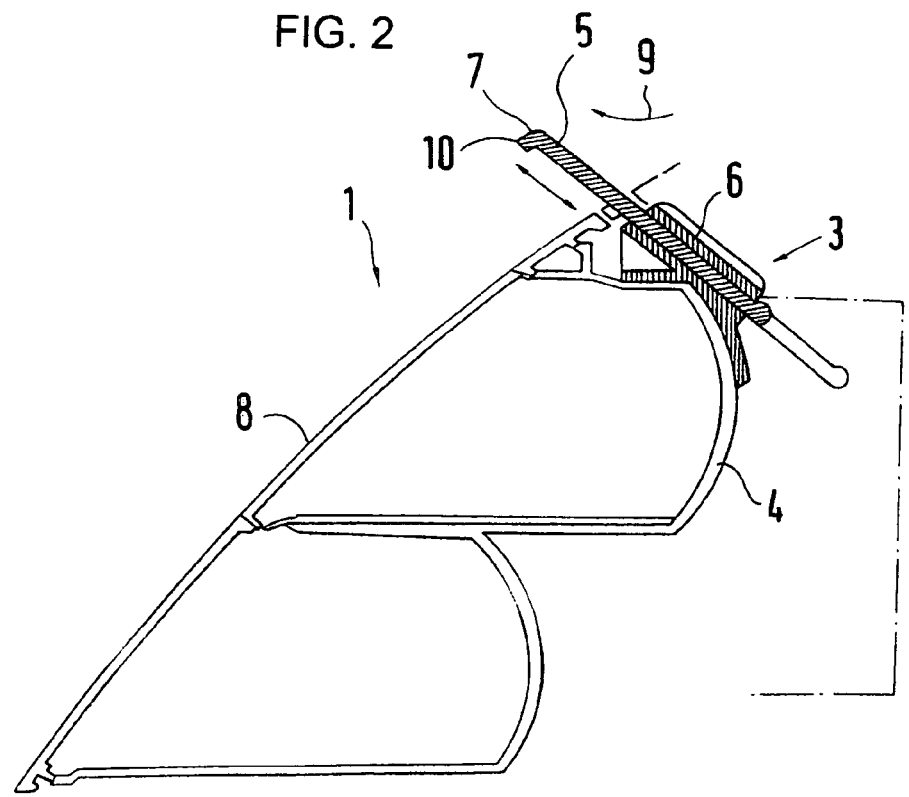
FIG. 2 shows a similar sectional view, but with a modified illuminating device and modified wind-deflecting device.

According to FIG. 2, a wind-deflecting device 3 is shown, in which a positioning angle of the wind-deflecting element 5 with respect to the horizontal is greater in comparison to the wind-deflecting device 3 shown in FIG. 1, as a result of which a different negative lift force in comparison thereto is produced. At the same time, the spoiler element 7 is designed differently, in particular is adapted to an external appearance of the motor vehicle.

FIG. 3 shows a wind-deflecting device 3 with a wind-deflecting element 5 which can be pivoted between its operative position and its inoperative position about a virtual pivot axis 11 arranged at a distance from the illuminating device 1. In this case, the guide 6 is of curved design unlike the guides 6 of FIGS. 1 and 2.

In the case of the wind-deflecting device 3 according to FIG. 4, the wind-deflecting element 5 is rotated between its operative position and its inoperative position about the pivot axis 11', with it being possible, in this embodiment too, as in the case of the other embodiments according to FIGS. 1 to 3, for different operative positions to be adopted.

A common feature of all of the embodiments is that the wind-deflecting element 5 can be driven by a driving device and can therefore be adjusted between the operative positions and the inoperative position, with the driving device likewise preferably being accommodated or integrated in the housing 4 of the illuminating device 1. In particular, an electric drive is suitable here as the driving device.

In general, FIGS. 1 to 4 show, in a respective sectional illustration, just a single illuminating device 1, and therefore an associated wind-deflecting device 3 is also provided for each of the customarily two illuminating devices 1 arranged at the rear of a motor vehicle. The integration according to the invention of the wind-deflecting device 3 in the illuminating device 1 enables, in particular, advantages to be achieved with regard to improved aerodynamics and therefore a reduced fuel consumption and advantages with regard to improving the negative lift by a defined separation edge and, as a result, greater driving stability and a shorter braking distance. Furthermore, an impairment of the external appearance of the motor vehicle is avoided, since the wind-deflecting element 5 is preferably extended or swung out only after a predefined minimum speed, for example 80 km/h (~50 mph). No safety-relevant changes in shape are therefore required, since the wind-deflecting device 3 remains in its inoperative state in particular in city driving, i.e. at lower speeds.

The invention claimed is:

1. A motor vehicle, comprising:
   at least one illuminating device disposed in a rear region of the motor vehicle, said illuminating device having a housing;
   at least one wind-deflecting device disposed in an upper edge region of said housing of said illuminating device, said wind-deflecting device having a wind-deflecting element movably mounted between an operative position in which said wind-deflecting element is effective as a wind-deflecting element and an inoperative position in which said wind-deflecting element is not effective as a wind-deflecting element and does not interfere with a view of said illuminating device;
   wherein said wind-deflecting element of said wind-deflecting device is retracted in said housing in the inoperative position and said wind-deflecting element projects out of said housing in the operative position;
   said wind-deflecting element of said wind-deflecting device being mounted at said housing of the illuminating device and enabled for at least one of the following movements:
      a translatory adjustment between the operative position and the inoperative position;
      rotation about an axis extending substantially transversely to the motor vehicle; or
      pivoting about a virtual pivot axis disposed at a distance from said illuminating device.

2. The motor vehicle according to claim 1, wherein, in the inoperative position, said wind-deflecting element remains within an outer contour of the motor vehicle.

3. The motor vehicle according to claim 1, which comprises a control device for controlling said wind-deflecting device as a function of parameters relating to vehicle dynamics of the motor vehicle.

4. The motor vehicle according to claim 3, wherein said control device is configured to activate and control said wind-deflecting device as a function of an illuminating function.

5. The motor vehicle according to claim 1, which comprises a drive for said wind-deflecting device integrated in said housing of said illuminating device.

* * * * *